(12) United States Patent
Strober

(10) Patent No.: US 9,767,195 B2
(45) Date of Patent: Sep. 19, 2017

(54) VIRTUALIZED HOSTING AND DISPLAYING OF CONTENT USING A SWAPPABLE MEDIA PLAYER

(75) Inventor: David Strober, Rye, NY (US)

(73) Assignee: TOUCHSTREAM TECHNOLOGIES, INC., New York, NY (US)

( * ) Notice: Subject to any disclaimer, the term of this patent is extended or adjusted under 35 U.S.C. 154(b) by 602 days.

(21) Appl. No.: 13/532,546

(22) Filed: Jun. 25, 2012

(65) Prior Publication Data

US 2013/0031478 A1    Jan. 31, 2013

Related U.S. Application Data

(63) Continuation-in-part of application No. 13/157,821, filed on Jun. 10, 2011, now Pat. No. 8,904,289.

(Continued)

(51) Int. Cl.
| | | |
|---|---|---|
| *G06F 3/01* | (2006.01) | |
| *G06F 17/30* | (2006.01) | |
| *G06F 9/44* | (2006.01) | |

(52) U.S. Cl.
CPC ...... *G06F 17/30846* (2013.01); *G06F 9/4445* (2013.01); *G06F 17/30864* (2013.01)

(58) Field of Classification Search
CPC ........................................................ G06F 3/01

(Continued)

(56) References Cited

U.S. PATENT DOCUMENTS

| 7,058,356 B2 | 6/2006 | Slotznick |
| 7,330,875 B1 | 2/2008 | Parasnis et al. |

(Continued)

FOREIGN PATENT DOCUMENTS

| CN | 101534449 | 9/2009 |
| CN | 10 1577650 | 11/2009 |

(Continued)

OTHER PUBLICATIONS

Hachman, M., "Snapstick's Media Streaming App/Box: Hands on," www.pcmag.com/article2/0,2817,2375455,00.asp, 2 pages, (Jan. 8, 2011).

(Continued)

*Primary Examiner* — Tadeese Hailu
*Assistant Examiner* — Darrin Hope
(74) *Attorney, Agent, or Firm* — Shook, Hardy & Bacon L.L.P.

(57) ABSTRACT

A system for presenting content includes a display device storing a virtual client. A display host is operable to execute multiple instances of a browser each of which operates as a swappable media player that is operable to retrieve and load any of a plurality of different media players needed to play specified content. The display host is operable to perform operations including receiving from a switchboard server system a message indicating that a specified media player is to be used to play particular content using a first instance of a swappable media player, retrieving and loading the specified media player from a content provider using the first instance of the swappable media player, playing the particular content in a first session using the specified media player, and causing a presentation of the content to be mirrored onto the virtual client residing on the display device.

20 Claims, 4 Drawing Sheets

Related U.S. Application Data

(60) Provisional application No. 61/477,998, filed on Apr. 21, 2011.

(58) Field of Classification Search
USPC .......................................................... 715/716
See application file for complete search history.

(56) References Cited

U.S. PATENT DOCUMENTS

| | | | |
|---|---|---|---|
| 7,424,718 | B2 | 9/2008 | Dutton |
| 7,440,972 | B2 | 10/2008 | Oetzel |
| 7,769,827 | B2 | 8/2010 | Girouard et al. |
| 7,835,505 | B2 | 11/2010 | Toyama et al. |
| 7,849,485 | B2 | 12/2010 | Paik et al. |
| 8,402,494 | B1 * | 3/2013 | Hu .......................... H04N 5/268 709/230 |
| 2002/0075332 | A1 | 6/2002 | Geilfuss et al. |
| 2002/0120666 | A1 | 8/2002 | Landsman et al. |
| 2002/0129102 | A1 | 9/2002 | Landsman et al. |
| 2002/0133518 | A1 | 9/2002 | Landsman et al. |
| 2002/0198778 | A1 | 12/2002 | Landsman et al. |
| 2003/0004804 | A1 | 1/2003 | Landsman et al. |
| 2003/0005000 | A1 | 1/2003 | Landsman et al. |
| 2003/0018885 | A1 | 1/2003 | Landsman et al. |
| 2003/0023488 | A1 | 1/2003 | Landsman et al. |
| 2003/0028565 | A1 | 2/2003 | Landsman et al. |
| 2003/0193520 | A1 | 10/2003 | Oetzel |
| 2004/0088728 | A1 | 5/2004 | Shimizu |
| 2005/0034151 | A1 | 2/2005 | Abramson |
| 2005/0144305 | A1 | 6/2005 | Fegan et al. |
| 2006/0083194 | A1 | 4/2006 | Dhrimaj et al. |
| 2006/0098624 | A1 | 5/2006 | Morgan et al. |
| 2006/0101098 | A1 | 5/2006 | Morgan et al. |
| 2006/0203758 | A1 | 9/2006 | Tee et al. |
| 2007/0094408 | A1 | 4/2007 | Gundla et al. |
| 2007/0155506 | A1 * | 7/2007 | Malik ............................ 463/42 |
| 2007/0202923 | A1 | 8/2007 | Jung et al. |
| 2007/0288715 | A1 | 12/2007 | Boswell et al. |
| 2008/0008439 | A1 | 1/2008 | Liu et al. |
| 2008/0028037 | A1 | 1/2008 | Moyer et al. |
| 2008/0077526 | A1 | 3/2008 | Arumugam |
| 2008/0126943 | A1 | 5/2008 | Parasnis et al. |
| 2008/0155600 | A1 | 6/2008 | Klappert et al. |
| 2008/0267369 | A1 | 10/2008 | Parlamas et al. |
| 2008/0270881 | A1 | 10/2008 | Meyer et al. |
| 2009/0108057 | A1 | 4/2009 | Mu et al. |
| 2009/0172780 | A1 | 7/2009 | Sukeda et al. |
| 2009/0228919 | A1 | 9/2009 | Zott et al. |
| 2009/0248802 | A1 * | 10/2009 | Mahajan ............... G06F 9/4445 709/204 |
| 2010/0027974 | A1 | 2/2010 | Ansari |
| 2010/0137028 | A1 | 6/2010 | Farris et al. |
| 2010/0205628 | A1 | 8/2010 | Davis et al. |
| 2010/0265939 | A1 | 10/2010 | Parlamas et al. |
| 2010/0281042 | A1 | 11/2010 | Windes et al. |
| 2011/0030020 | A1 | 2/2011 | Halttunen |
| 2011/0060998 | A1 | 3/2011 | Schwartz et al. |
| 2011/0090898 | A1 | 4/2011 | Patel et al. |
| 2011/0107227 | A1 | 5/2011 | Rempell et al. |
| 2011/0131607 | A1 | 6/2011 | Thomas et al. |
| 2011/0138354 | A1 | 6/2011 | Hertenstein et al. |
| 2011/0214148 | A1 | 9/2011 | Gossweiler et al. |
| 2011/0231265 | A1 | 9/2011 | Brown et al. |
| 2011/0231566 | A1 | 9/2011 | Gelter et al. |
| 2011/0296465 | A1 | 12/2011 | Krishnan et al. |
| 2012/0054616 | A1 * | 3/2012 | Mittal ............... G06F 17/30899 715/722 |
| 2012/0059875 | A1 | 3/2012 | Clark |
| 2012/0102209 | A1 * | 4/2012 | Fok Ah Chuen et al. .... 709/228 |

FOREIGN PATENT DOCUMENTS

| | | |
|---|---|---|
| CN | 101778198 | 7/2010 |
| CN | 101815073 | 8/2010 |
| EP | 2175607 A1 | 4/2010 |
| JP | 2004-356695 A | 12/2004 |
| JP | 2006-525771 A | 11/2006 |
| WO | 2004100500 A2 | 11/2004 |

OTHER PUBLICATIONS

Dolcourt, J., CES: Snapstick takes on Apple TV, Google TV, http://news.cnet.com/8301-17938_105-20025100-1.html, 3 pages, (Dec. 9, 2010).

Shaivitz, M., "The Web to Your TV, With a Flick of a Wrist? Slapstick Says Yes," http://techcocktail.com/the-web-to-our-tv-with-a-flick-of-a-wrist-slapstick-says-yes-2010-12, 2 pages, (Dec. 10, 2010).

Snapstick—Home, "Snapstick," http://www.snapstick.com/, 2 pages, printed on Mar. 2, 2011.

Paul, I., Hands on: YouTube Leanback, PCWorld, http://www.pcworld.com/article/200769/hands_on_youtube_leanback.html, 3 pages, (Jul. 9, 2010).

Using AirPlay, Article HT4437, http://support.apple.com/kb/HT4437, 3 pages, (Apr. 18, 2011).

Cheng, J., "Stream AirPlay video to regular TV? Apple might make it happen," http://arstechnica.com/apple/news/2011/03/stream-airplay-video-to-a-regular-tv-apple-migh . . . , 1 page, printed on Jun. 7, 2011.

"Using the Play to feature to stream media," http://windows.microsoft.com/en-US/windows7/using-the-play-to-feature-to-stream-media, 3 pages, printed on Jun. 7, 2011.

"YouTube—Leanback," http://www.youtube.com/t/leanback, 1 page, printed on Jun. 7, 2011.

"Yahoo!7 TV Guide for iPhone, iPod touch and iPad on the iTunes App Store," http://itunes.apple.com/au/app/yahoo-7-ty-guide/id42471992?mt=8, 2 pages, printed on Jun. 7, 2011.

Hu, C., et al., "Mobile Media Content Sharing in UPnP-Based Home Network Environment," Journal of Information Science and Engineering 24, 1753-1769. (2008).

Fallakhair, S., et al., "Dual Device User interface Design for Ubiquitous Language Learning: Mobile Phone and Interactive Television (iTV)," Proceedings of the 2005 IEEE Int'l Workshop on Wireless an Mobile Technologies in Education, 8 pages, 2005.

Ask Search Internet Search, session identifier random, printed on Nov. 19, 2011.

Webopedia computer dictionary, session cookie, printed on Nov. 19, 2011.

Webopedia computer dictionary, web identifier, printed on Nov. 19, 2011.

Webopedia computer dictionary, user session, printed on Nov. 19, 2011.

www.vbulletin.com, Best way to generate Random, Unique ID's, printed on Nov. 19, 2011.

www.vbulletin.com, Best way to generate Random, Unique ID's, Internet Archive Wayback Machine, Jan. 16, 2009.

Official communication from the USPTO in U.S. Appl. No. 13/245,001, dated Dec. 8, 2011.

U.S. Appl. No. 13/245,001, filed Sep. 26, 2011.

Japanese Patent Office, Examination Report for JP Patent App. No. 2014-506460, dated Jun. 28, 2016 (6 pages) (and English Translation).

* cited by examiner

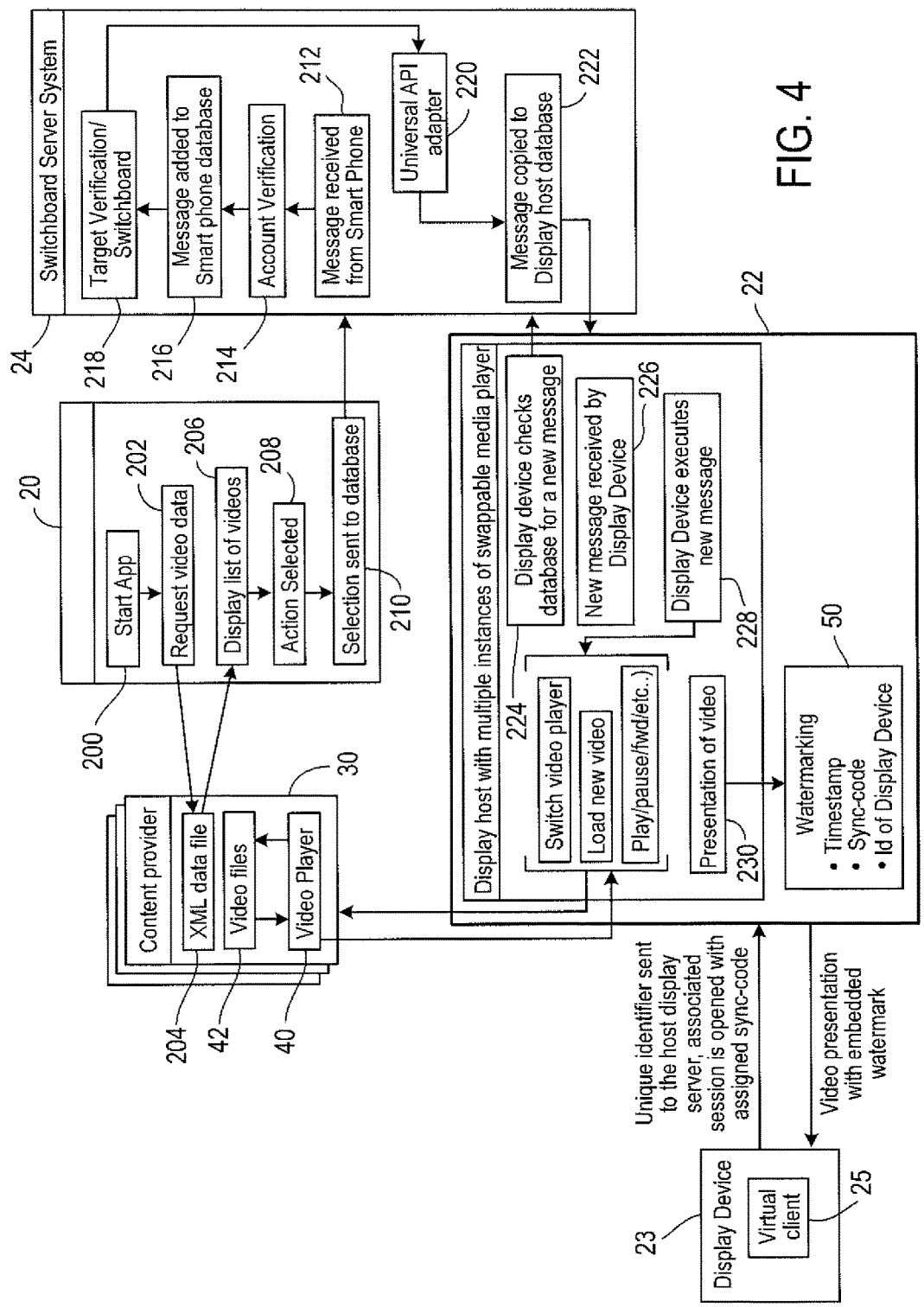

VIRTUALIZED HOSTING AND DISPLAYING OF CONTENT USING A SWAPPABLE MEDIA PLAYER

RELATED APPLICATION(S)

The present application is a continuation-in-part of U.S. application Ser. No. 13/157,821, filed on Jun. 10, 2011, which in turn claims the benefit of priority of U.S. Provisional Patent Application No. 61/477,998, filed on Apr. 21, 2011. The contents of the earlier applications are incorporated herein by reference.

BACKGROUND

Techniques are known to facilitate operating a display device remotely from a personal computing device, such as a mobile phone, in order to view a video file or other content on the display device. For example, U.S. patent application Ser. No. 13/157,821 describes a system in which a server system acts as a single interface that can be used to control any one of multiple media players (i.e., computer software applications for playing video or other content) that may be needed to play different video or other files on a display device such as a television screen. As an example, the display device may receive from the server system a message, based on input from a mobile phone, that instructs the display device to access a content provider, load a specific media player, load specific content (e.g., a video) to be played on the display device, and play the content on the display device using the media player.

Recently, various types of display devices have become popular and their use has become widespread. For example, some applications can be run on a gaming console, a tablet computer, a television set, or a set-top box, where the display device serves as a platform for audio-visual media such as books, movies, music, games or web content. However, some of these display devices have somewhat limited processing power and, therefore, may not be sufficiently powerful to run a swappable media player such as described in the foregoing patent application. Thus, using the techniques described in the foregoing patent application to control the display of content on such display devices presents a challenge.

SUMMARY

The present disclosure describes techniques to facilitate controlling the content that is displayed on various display devices, using a personal computing device such as a mobile phone. The techniques make use of a display host that acts, in part, as a swappable media player so that a wide range of video or other content can be played on the display device regardless of the particular media player that may be needed to play the video or other file.

In one aspect, for example, a machine-implemented method of presenting content on a display device includes receiving, in a display host, a communication from a display device. The display host is operable to execute multiple instances of a browser each of which operates as a swappable media player, wherein each instance of the swappable media player is operable to retrieve and load any of a plurality of different media players needed to play specified content. The method includes opening a first session using a first instance of the swappable media player, and requesting assignment of a unique identifier for the first session from a switchboard server system. A unique identifier for the first session is received from the switchboard server system. The method includes displaying the unique identifier in the first session, and causing the display of the unique identifier to be mirrored onto a virtual client residing on the display device.

The foregoing method can be used, for example, to establish a link between a particular instance of the swappable media player and a particular display device. The unique identifier displayed on the virtual client residing on the display device then can be entered into a computing device (e.g., a mobile phone) that is to be used to select and control the playing of content on the display device.

According to another aspect, the method includes receiving in the display host a message indicating that particular content is to be played in a first session using a specified media player. The specified media player can be retrieved and loaded, and the particular content can be played in the first session using the specified media player. The method can include causing a presentation of the content to be mirrored onto the virtual client residing on the display device. In some implementations, the method includes receiving in the display host a second message indicating that particular second content is to be played in the first session using a specified second media player. The specified second media player can be retrieved and loaded, and the particular second content can be played in the first session using the specified second media player. The method can include causing a presentation of the second content to be mirrored onto the virtual client residing on the display device.

Systems for presenting content are described as well. For example, in some implementations, a system for presenting content includes a display device storing a virtual client. The system includes a display host operable to execute multiple instances of a browser each of which operates as a swappable media player, wherein each instance of the swappable media player is operable to retrieve and load any of a plurality of different media players needed to play specified content. The system also includes a switchboard server system. The display host is operable to perform operations including receiving from the switchboard server system a message indicating that a specified media player is to be used to play particular content using a first instance of a swappable media player, retrieving and loading the specified media player from a content provider using the first instance of the swappable media player, playing the particular content in a first session using the specified media player, and causing a presentation of the content to be mirrored onto the virtual client residing on the display device. In some implementations, the message indicating that a specified media player is to be used to play particular content using a first instance of a swappable media player includes a unique identifier for the first session. Also, in some implementations, the display host is further operable to incorporate a watermark into the content before the content is mirrored onto the virtual client, wherein the watermark includes the unique identifier.

Various implementations include one or more of the following advantages. For example, the techniques described here can be used even if the display device has somewhat limited processing power and would not be sufficiently powerful to run the swappable media player. Furthermore, the techniques can facilitate centralized processing of the swappable media player for multiple display devices (e.g., television sets located in multiple guest rooms in a hotel).

Other aspects, features and advantages will be apparent from the following detailed description, the accompanying drawings, and the claims.

BRIEF DESCRIPTION OF THE DRAWINGS

FIG. 4 illustrates another example for playing user-selected content on a user-selected display device.

DETAILED DESCRIPTION

Figure 1:
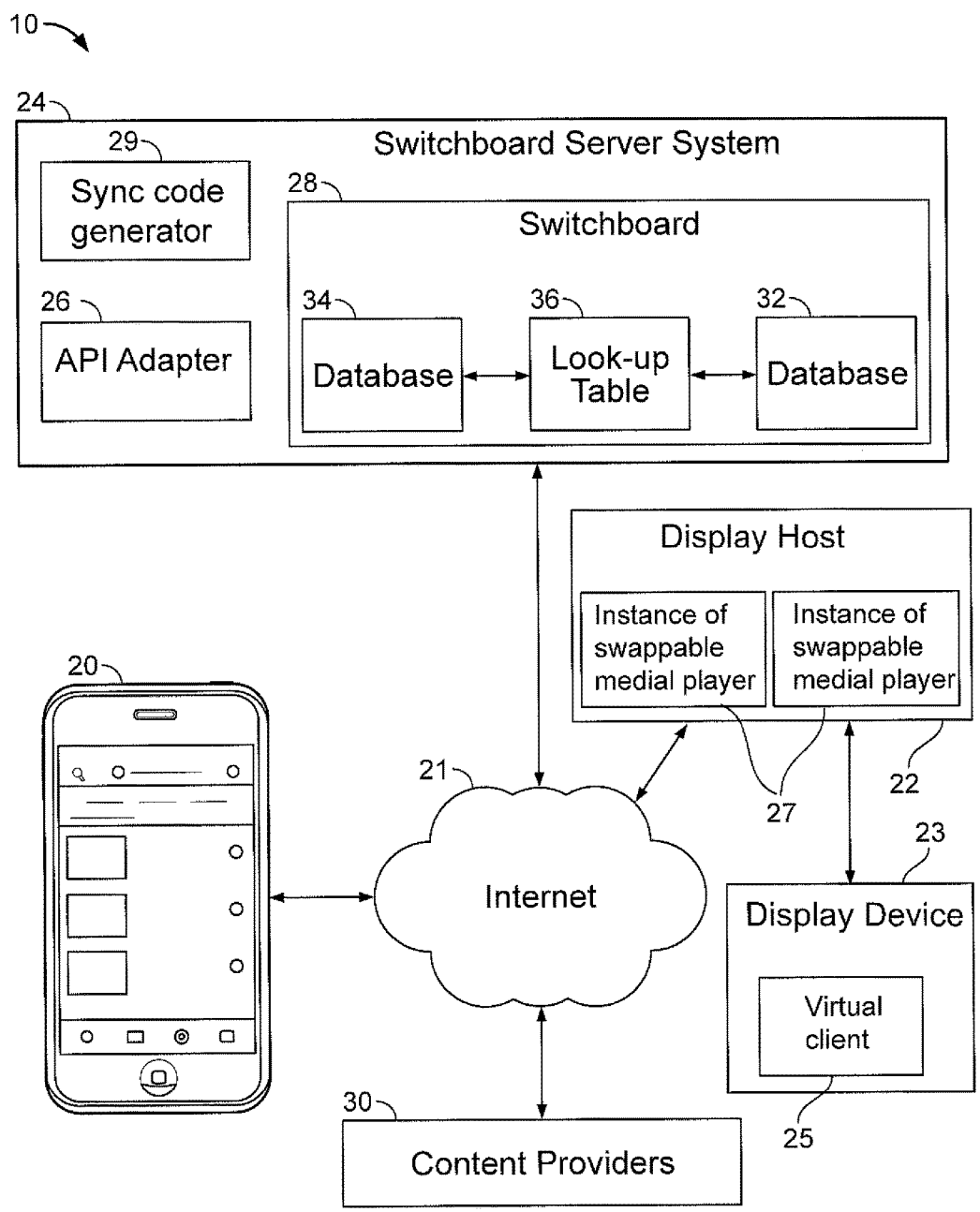
FIG. 1 is a block diagram illustrating an example of a system according to the invention.

As shown in FIG. 1, a system 10 synchronizes a connection between a control device 20 and a display device 23 to facilitate the playing of content on the display device 23. For example, a user of the first device 20 can select content and control the content displayed on the display device 23. For purposes of illustration, in the following discussion, it is assumed that first device 20 is a personal computing device such as a mobile phone that includes a display, an internal microprocessor or other processing circuitry, a keypad, keyboard, touchscreen, mouse, trackball, or other device to receive user selections and other input, and a transceiver to establish communications to the Internet 21. More generally, however, the first device 20 can be any type of handheld or other Internet-enabled personal computing device, including personal computers, e-books, kiosks, tablets, smart phones and media players. In some cases, input from the user can be received in forms other than tactile input (e.g., acoustic or speech). Examples of the display device 23 include a gaming console, tablet computer, set-top box, television set, personal computer or laptop computer with a display screen. In some implementations, the display device 23 may have limited processing power. Although FIG. 1 shows only a single display device 23 coupled to the display host 22, there may be multiple display devices coupled to the display host 23 at the same time. Furthermore, the display devices may be of different types.

In the illustrated example, the mobile phone 20 is operable to display an application or web site that contains information and links to content providers 30 on a computer network such as the Internet 21. A display host 22, which may be implemented, for example, as a server system or other computing device (e.g., a personal home computer), is coupled to the Internet and is operable to link back to a switchboard server system 24 from which the display host 22 receives messages regarding the playing of specified content.

The display host 22 is operable to execute multiple sessions of a browser each of which operates as a swappable media player. Each session operates as a virtual display device that includes a unique instance 27 of the swappable media player and is assigned a unique synchronization code ("sync code"), which serves as an identifier for the session. Each session is associated with a specified display device such as the display device 23. The display device 23 may be connected to the display host, for example, through a wireless connection, a wired connection (e.g., a co-axial cable), or through the Internet 21 or other network.

The various instances 27 of the swappable media player run on the display host 22 are independent of one another. Thus, each instance 27 of the swappable media player can play content (e.g., a video) during a particular session that differs from the content being played by other instances 27. Furthermore, the different instances 27 of the swappable media player running on the display host 22 may use different media players (i.e., software applications to play the content) from one another depending on the particular content being played by each instance. In addition, as discussed in greater detail below, each particular instance 27 of the swappable media player can retrieve the appropriate media player needed to play the specified content.

In the illustrated example, the display device 23 includes a thin, virtual client 25 that can display content (e.g., a video) being played by a specific instance 27 of the swappable media player on the display host 22. The virtual client 25 relies on the display host 22 to perform the data processing required for displaying the selected content. The display device 23 may be a dedicated thin client terminal or a computing device with thin client software that sends user input to the display host 22 and receives screen output in return. Although the virtual client 25 processes the user interface, it need not process data.

As explained in greater detail below, the virtual client 25 can have a unique identifier associated with it. In some cases, the unique identifier may be assigned when the software program is downloaded to the display device 23. When the display device 23 connects to the display host 22, the unique identifier associated with the virtual client 25 on the display device 23 is paired with a unique assigned sync code, which, in turn, is associated with a particular instance 27 of the swappable media player so that the appropriate session is paired with the correct virtual client and display device (e.g., virtual client 25 on display device 23).

Figure 2:
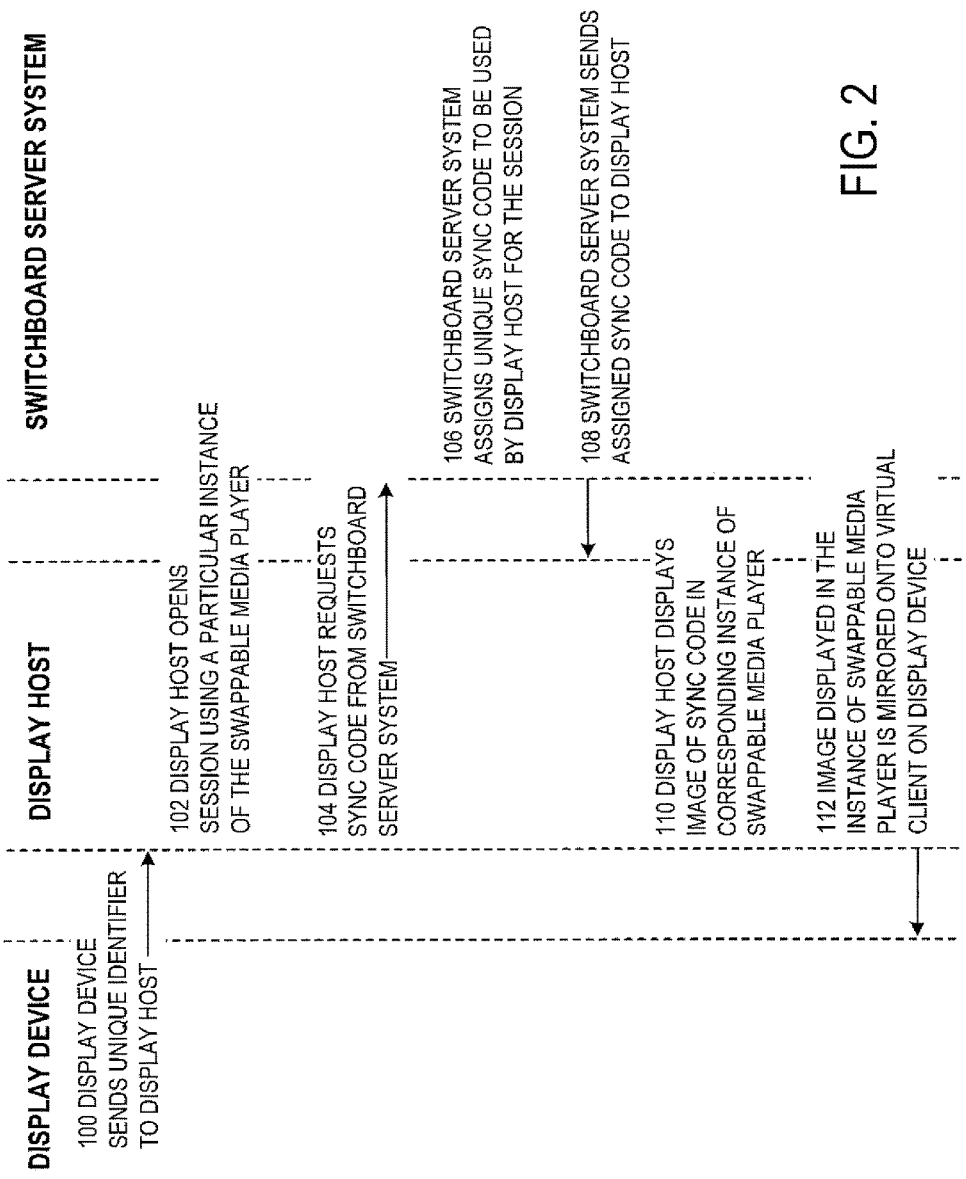
FIG. 2 illustrates a method for establishing a session for playing content on a user-selected display device using a swappable media player.

The following paragraphs describe how a connection can be established between the mobile phone 20 and the display device 23 so that the mobile phone can be used to control the display and playing of content on the display device 23. As indicated by FIG. 2, when the display device 23 initially connects to the display host 22, the display device 23 sends the unique identifier associated with the virtual client 25 to the display host 22 (see 100 in FIG. 2). In the event there is no such unique identifier provided by the display device 23, the display host 22 automatically can assign a unique identifier to the display device 23. The display host 22 opens a session using a particular instance 27 of the swappable media player (see 102 in FIG. 2). The session is associated uniquely with the identifier for the virtual client 25/display device 23. The display host 22, which stores (e.g., in a database) the one-to-one correspondence between the session and the display device 23, also requests a sync code from the switchboard server system 24 (see 104 in FIG. 2). The switchboard server system 24 assigns a unique sync code to be used by the display host 23 for the session (see 106 in FIG. 2), and stores the correspondence between the sync code and the display host session in a database for future reference. The switchboard server system 24 includes a sync code generator 29 to generate the sync codes and can use, for example, the display host's browser cookie as an identifier for the display host 23. The switchboard server system 24 then sends the assigned sync code to the display host 22 (see 108 in FIG. 2). Upon receiving the sync code assigned to the particular session, the display host 22 stores (e.g., in a database) the association between the sync code and the particular session, and displays an image of the sync code in the corresponding instance 27 of the swappable media player (see 110 in FIG. 2). The image displayed in the instance 27 is mirrored onto the virtual client 25 on the display device 23 using, for example, a virtual network connection (VMC) or other virtualization technology (see 112 in FIG. 2). The sync code may be displayed, for example, as text or as a QR code.

Once the sync code appears on the display device 23, the user of the mobile phone 20 can enter the sync code into the mobile phone, for example, manually (e.g., using a keyboard) or by scanning the displayed sync code into the mobile phone (see 114 in FIG. 2). The code can be scanned, for example, using optical scanning or RFID techniques. The mobile phone 20 then sends a message containing the sync code to the switchboard server system 24 (see 116 in FIG. 2), which associates the received sync code with the matching sync code already stored in its database (see 118 in FIG. 2). The switchboard server system 24 includes a look-up table 36 that, based on the sync code, stores the correspondence between the mobile phone 20 and the session of the swappable media player on the display host 22. Thus, once the sync code is entered into, or captured by, the mobile phone 20, it is sent from the mobile phone 20 to the switchboard server system 24, which stores the information in the look-up table 36 so as to establish a connection, through the switchboard server system 24, between the mobile phone 20 and the particular session of the swappable media player on the display device 23. As there is a one-to-one correspondence between the sync code, the particular session on the display host 22 and the display device 23, the mobile phone 20 effectively can be paired with, and thus connected to, the virtual client 25 operating on the display device 23 by way of the switchboard server system 24 and the unique session of the swappable media player running on the display host 22.

Next, the switchboard server system 24 sends a message to the display host 22 indicating that the swappable media player on the display host 22 and the mobile device 20 are connected (see 120 in FIG. 2). The particular instance 27 of the swappable media player can display an indication (e.g., a message or other indicator) that it is connected to the mobile device 20 (see 122 in FIG. 2). This indication is mirrored onto the display device 23 (see 124 in FIG. 2), allowing the user of the mobile phone 20 to confirm that the phone can be used to control the playing of content on the display device 23, as explained below.

The following paragraphs describe how a user of the mobile phone 20 can select content and cause the content to be displayed on the display device 23. When a user makes a selection using the mobile phone 20 for particular content to be displayed on the display device 23, a message is sent through the Internet 21 to the switchboard server system 24. The message may, for example, identify particular content to be played and a media player needed to play the content, and also may contain the sync code. A corresponding message then is passed along to the display host 22, which acts on a transmission code contained within the signal and performs specified actions based on the transmission code. For example, in some scenarios, the message from the switchboard server system 24 instructs the particular instance 27 of the swappable media player on the display host 22 to access a content provider 30 through the Internet 21, load a specific media player, load the media player-specific content and play the content. The particular instance 27 of the swappable media player on the display host 22 plays the specified content using the session of the swappable media player associated with the display device 23. The contents of the session are mirrored automatically onto the display device 23 via the virtual client 25, thereby allowing the user of the mobile phone 20 to view the content on the display device 23. The mobile phone 20 also can be used to issue playback commands (e.g., play, pause, fast-forward, rewind, stop, etc.) to control the session.

Although in some examples the content is a video to be played on the display 23, the system 10 can be used for other types of content as well. Thus, depending on the implementation, the content may include one or more of the following: video, audio, interactive video game, streaming media, multimedia, images, slides (e.g., a PowerPoint presentation) or other types of dynamic content.

Figure 3:
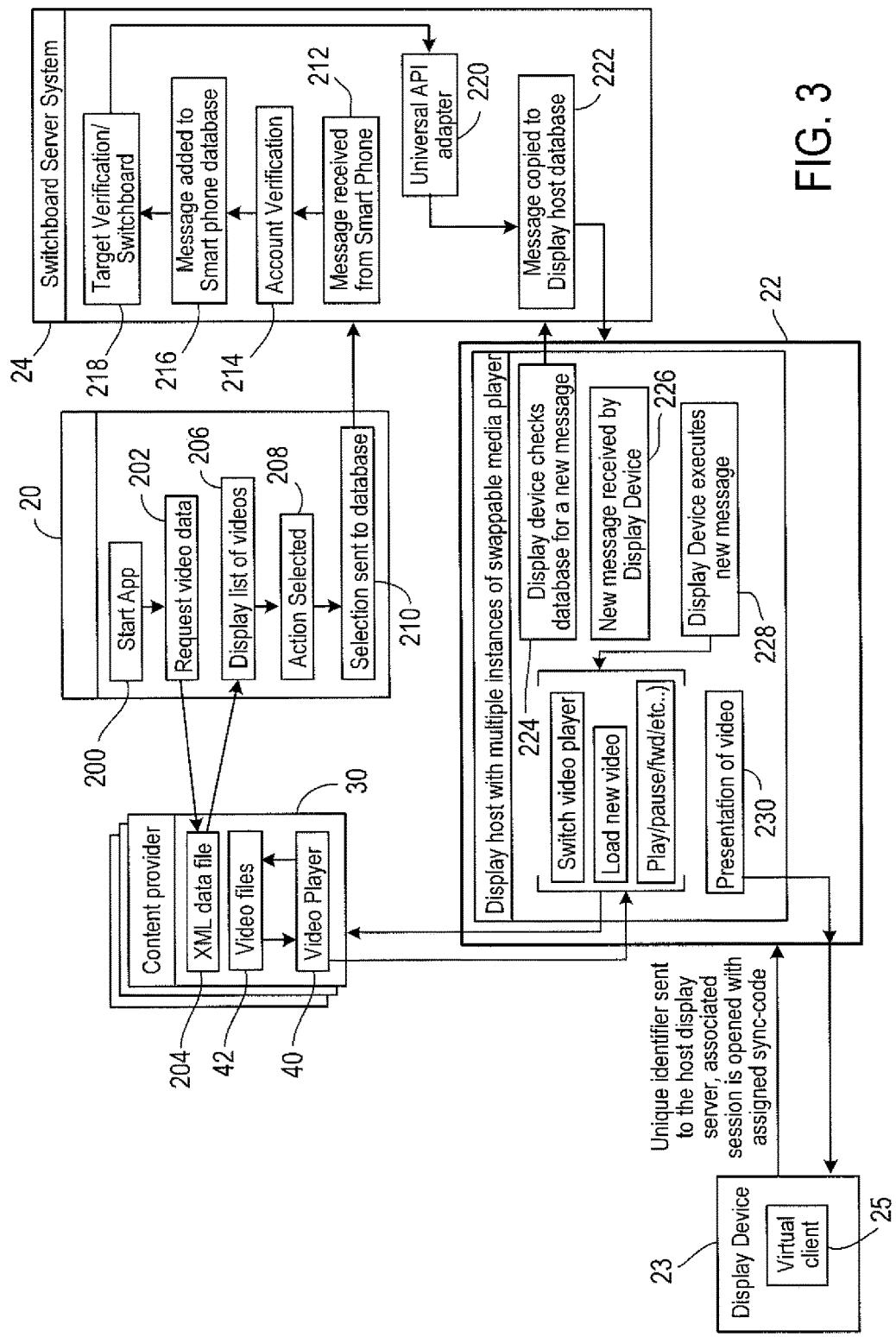
FIG. 3 illustrates an example for playing user-selected content on a user-selected display device.

FIG. 3 illustrates further details of the flow of information and signals according to some implementations. The mobile phone 20 is operable to display an application or web site that contains information and links to content providers 30 on the Internet 21. The user operates the mobile phone 20 so as to start the application or access the web site (block 200). In some implementations, a logo appears on the mobile phone's display. By selecting the logo, the user causes a menu to expand and present various options. The options can include, for example: (i) add new content to a playlist, (ii) play a listed item on a secondary device, (iii) play a listed item on the mobile phone 20. If the user selects to add new content to the playlist, the user is presented with a screen that allows him to enter user-defined search parameters or to select predefined search parameters to request video data. The search parameters are sent from the mobile phone 20 as part of a request for video data that satisfy the search parameters (block 202). The request is transmitted via the Internet 21 to the appropriate content provider web site. In response, the content provider 30 provides metadata (e.g., titles, links to the videos) for one or more video files that satisfy the search parameters. The metadata can be provided to the mobile phone 20, for example, in the form of an XML data file 204. Upon receiving the data file, the mobile phone 20 displays a list of one or more videos based on the information received from the content provider 30 (block 206).

If desired, the user can take one of several actions, including selecting one of the videos from the displayed list to be played or initiating a command with respect to a video that already has been loaded to the display host 22 (blocks 208). The mobile phone 20 then formats and transmits a message to the switchboard server system 24 (block 210). The message from the mobile phone 20 contains a transmission code that includes data regarding the user information (e.g., user identification or account number), the location and name of the media player for the selected video, a playback command (e.g., play, pause, rewind, fast-forward, etc.), and the video file to be acted upon. The message also includes the sync code previously acquired from the display device 23.

The message from the mobile phone 20 is transmitted over the Internet or other network 21 and is received by the switchboard server system 24 (block 212). Based on information in the message from the mobile phone 20, the switchboard server system 24 can verify that the user has an account (block 214), and the contents of the message, as well as the date and time of receipt of the message, can be added to a personal computing device database 32 (block 216) which forms part of a switchboard 28 (see FIG. 1). In general, all messages from a particular user's personal computing device 20 can be stored in the database 32 corresponding to an account for the particular user. Thus, the database 32 stores a record of all messages received from a user's personal computing device 20, as well as the user's identification, an indication of the host display 22, an identification of the media player that is required for the selected video, and an identification of the selected video. The switchboard server system 24 also can perform a target verification (block 218), which can include checking whether a connection to the display host 22 already is established for the mobile phone 20. Signals sent from the mobile device 20 to its associated database 32 are copied to a database 34 associated with the session of the swappable media player on the display host 22 based on the sync code.

In the illustrated implementation, the playback control command in the message from the mobile phone 20 contains a JavaScript reference to control the media player needed to play the selected video. Various types of video players may use different JavaScript commands to control their respective playback. Therefore, in the illustrated implementation, a universal adapter 26 is provided to interpret and convert a standard or universal command (e.g., play, pause, etc.) into the specific command recognized by the media player. Each time a signal is received from the mobile device 20, the API adapter 26 checks and identifies the specific media player that is being requested. Based on this information, the system loads the appropriate set of protocols or application programming interfaces (APIs) from its library and converts the incoming commands from the mobile device 20 into the correct JavaScript (or other programming) code used by the target device 22 to control the specific media player (block 220). The switchboard server system 24 then copies the converted version of the message to the database 34 associated with the display host 22, as indicated above in connection with block 222.

The universal adapter 26 can be implemented, for example, as a look-up table. For example, for a universal command "New Video," the universal adapter 26 provides the corresponding command for each of several specific media players (e.g., "yt_loadVideo" for YouTube). Similarly, for a universal command "Pause," the universal adapter 26 provides the corresponding command for each of several specific media players (e.g., "pauseVideo" for Ted-.com). Other universal commands and the corresponding command(s) for one of more media players (i.e., software applications to play the content) also can be stored by the universal adapter 26.

The display host 22 periodically checks the entries in the database 34 to determine if there are any new messages for it (block 224). For example, in some implementations, the display host 22 polls the associated database 34 at some predetermined time interval (e.g., every half second). In some implementations, instead of the display host 22 periodically checking whether there are any messages for it in the database 34, the server system 24 can push the messages to the display host 22. In any event, the system is arranged so that the display host 22 receives the messages intended for it.

When the display host 22 receives a message from the switchboard server system 24 (block 226), the display host executes the message (block 228). In some cases, the media player required to play the video indicated in the message is not presently loaded in the display host 22. For example, the received command may be to "play" a particular video. If the media player needed to play the video is not already loaded in the display host 22, the display host 22 requests and obtains a copy of the appropriate media player 40 as well as a copy of the video file 42 from a content provider 30, loads the media player and then plays the video in the particular session of the swappable media player indicated by the sync code (block 230). Likewise, if the appropriate media player already is loaded in the display device, but the particular video is not, then the display host 22 requests and obtains a copy of the video file 42 from the content provider 30 and proceeds to play the video in the particular session based on the sync code.

As the session of the swappable media player on the display host 22 plays the video, each frame is captured and transmitted to the display device 23 using for example, appropriate virtualization technology (e.g., a virtual network connection). Thus, the video playing in the particular session associated with the display device 23 is mirrored onto the virtual client 25 running on the display device 23 in substantially real time, thereby allowing the user to view the video on the display device 23.

Once the video is playing on the display device 22, the user of the mobile phone 20 can control the playing of the video by entering appropriate commands (e.g., pause, fast forward, rewind, stop, play, etc.) through the mobile phone. Each command is incorporated into a message that is transmitted to the switchboard server system 24, which copies the message into database entries associated with the particular display host 22 (i.e., after performing any conversion of the command by the API adapter 26). Once the message is retrieved by or sent to the display host 22, the display host proceeds to execute the command.

The user of the mobile phone 20 may subsequently select other content to be played on the display device 23. If a different media player is needed to play this other content, the particular instance 27 of the swappable media player that is associated with the sync code retrieves the appropriate media player from a content provider 30. Thus, the same session of the swappable media player on the display host 22 can be used to play the other content regardless of whether the same or a different media player is needed.

In some implementations it may be desirable to provide a form of digital rights security with respect to the content that is being provided to the display device 23. For example, as shown in FIG. 4, before providing the requested content to the display device 23, a watermarking module 50 in the display host 22 can provide a watermark that incorporates, for example, a time stamp, the sync code, and the unique identifier associated with the virtual client 25 and the display device 23. The watermark can be inserted, for example, into the content (e.g., the video) using known techniques in a manner that is detectable by software, but that is not discernable by the human eye. In some cases, the video signal that is transmitted to the virtual client 25 can be encrypted by the display host 22 and then decrypted on the client side.

As mentioned above, the system and methods described above also can be used with various types of content other than video. In that case, different types of user-initiated commands may be available to control playing or display of the content. For example, for interactive video games, the user-initiated commands may include control commands appropriate for the particular game.

Although in many scenarios there will be a one-to-one correspondence between a computing device 20 that controls the content on a display device 23, the techniques described here also can be incorporated into co-viewing situations, for example, where multiple computing devices (e.g., mobile phones) interact with a single display device 23, a single computing device 20 controls communications with multiple displays 23, or multiple computing devices 20 control communications with multiple displays 23.

For example, a single computing device 20 may be used to control multiple display devices 23 so that the same content is displayed on each of the display devices at the same time (e.g., multiple televisions sets in a bar). In that case, a different sync code may be associated with each of the display devices 23, with each display device 23 associated with a different session of the swappable media player on the display host 22. Each message from the computing device 20 may include a series of sync codes so that all of the display devices are controlled using the same message from the computing device 20. In other implementations, each message from the computing device 20 may include a group identifier, which is associated at the switchboard server system 24 with multiple sync codes, each of which corresponds to a different session of the swappable media player on the display host 22.

The techniques described in this document can be applied in a wide range of contexts. For example, a hotel can have a central server that operates as the display host 22 and each television in the guest rooms can serve as a virtual client 25. The techniques also can be applied beyond a single location. For example, a cable operator can host the display host 22 and a set-top box in each subscriber's home can serve as a virtual client 25. In addition, a personal home computer can serve as the host display 22, with one or more display devices 23 connected to it.

Implementations of the subject matter and the operations described in this specification can include digital electronic circuitry, or in computer software, firmware, or hardware, including the structures disclosed in this specification and their structural equivalents, or in combinations of one or more of them. Implementations of the subject matter described in this specification can include one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can include operations performed by a data processing apparatus on data stored on one or more computer-readable storage devices or received from other sources. The term " data processing apparatus" encompasses all kinds of apparatus, devices, and machines for processing data, including by way of example a programmable processor, a computer, a system on a chip, or multiple ones, or combinations, of the foregoing. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile, audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Although this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein and the attachments hereto should not be understood as requiring such separation in all implementations, and it should be understood that the described program components and systems can generally be integrated together in a single software product or packaged into multiple software products.

Thus, although particular implementations have been described, other implementations are within the scope of the claims.

What is claimed is:

1. A system for presenting content comprising:
a display host operable to execute multiple instances of a browser each of which operates as a swappable media player, wherein each instance of the swappable media player is operable to retrieve and load any of a plurality of different media players needed to play specified content; and
a switchboard server system,
wherein the switchboard server system is operable to perform operations including:
receiving a first message originating from a handheld Internet-enabled personal computing device distinct from the display host and the switchboard server system, wherein the first message comprises a unique identifier associated with a display device and a first session opened using a first instance of the swappable media player, and a first universal command instructing that first content be played in the first session using a specified first media player of the media players;
converting the first universal command into a corresponding first converted code specific to the specified first media player to control playing of the first content on the specified first media player; and
transmitting the first converted code and the unique identifier to the display host; and
wherein the display host is operable to perform operations including:
receiving the first converted code and the unique identifier from the display host;
in response to receiving the first message and the unique identifier, retrieving and loading the specified first media player using the first instance of the swappable media player;
playing the first content in the first session using the specified first media player by executing the first converted code; and
causing a presentation of the first content to be mirrored onto a virtual client residing on the display device;
wherein the switchboard server system is further operable to perform operations including:
receiving a second message originating from the handheld Internet-enabled personal computing device, wherein the second message comprises the unique identifier and a second universal command identifying a particular play control to be performed with respect to the first content being played in the first session, wherein the second universal command is different than the first universal command;
converting the second universal command into a corresponding second converted code specific to the specified first media player to perform the particular play control; and
transmitting the second converted code and the unique identifier to the display host; and
wherein the display host is further operable to perform operations including
receiving the second converted code and the unique identifier from the display host from the switchboard server; and
executing the second converted code to perform the particular play control with respect to the first content being played in the first session that is mirrored onto the virtual client residing on the display device.

2. The system of claim 1,
wherein the switchboard server system is further operable to perform operations including:
receiving a third message originating from the handheld Internet-enabled personal computing device, wherein the third message comprises the unique identifier and the first universal command instructing that second content be played in the first session in the first session using a specified second media player of the media players;
converting, using the switchboard server system, the first universal command into a corresponding third converted code specific to the specified second media player to control playing of the second content on the specified second media player; and
transmitting the third converted code and the unique identifier to the display host; and
wherein the display host is further operable to perform operations including:
receiving the third converted code and the unique identifier from the switchboard server system;
in response to receiving the third converted code and the unique identifier, retrieving the second media player from a content provider and loading the second media player using the first instance of the swappable media player;
playing the second content in the first session using the specified second media player by executing the third converted code; and
causing a presentation of the second content to be mirrored onto the virtual client residing on the display device.

3. The system of claim 2, wherein the system further includes a second display device,
wherein the switchboard server system is further operable to perform operations including:
receiving, a fourth message, wherein the fourth message comprises a second unique identifier associated with a second display device and a second session opened using a second instance of the swappable media player, and the first universal command instructing that third content be played in the second session using a specified third media player of the media players;
converting the first universal command into a corresponding fourth converted code specific to the specified third media player to control playing of the third content on the specified third media player; and
transmitting the fourth converted code and the second unique identifier to the display host; and
wherein the display host is further operable to perform operations including:
receiving the fourth converted code and the second unique identifier from the switchboard server system;
in response to the fourth converted code and the second unique identifier, retrieving the specified third media player from a content provider and loading the third media player using the second instance of the swappable media player;

playing the third content in the second session using the specified second media player by executing the fourth converted code; and causing a presentation of the third content to be mirrored onto a virtual client residing on the second display device.

4. A machine-implemented method of presenting content on a display device, the method comprising:

establishing a first communications link between a display host and a switchboard server system, and a second communications link between the display host and a display device, wherein the display host is operable to execute multiple instances of a browser each of which operates as a swappable media player, wherein each instance of the swappable media player is operable to retrieve and load any of a plurality of different media players needed to play specified content;

receiving, at the switchboard server system, a first message originating from a handheld Internet-enabled personal computing device distinct from the display host and the switchboard server system, wherein the first message comprises a unique identifier associated with the display device and a first session opened using a first instance of the swappable media player, and a first universal command instructing that first content be played in the first session using a specified first media player of the media players, converting, using the switchboard server system, the first universal command into a corresponding first converted code specific to the specified first media player to control playing of the first content on the specified first media player;

receiving, at the display host, the first converted code and the unique identifier from the switchboard server system;

in response to receiving the first converted code and the unique identifier, retrieving and loading, by the display host, the specified first media player using the first instance of the swappable media player;

playing, at the display host, the first content in the first session using the specified first media player by executing the first converted code;

causing, by the display host, a presentation of the first content to be mirrored onto the virtual client residing on the display device;

receiving, at the switchboard server system, a second message originating from the handheld Internet-enabled personal computing device, wherein the second message comprises the unique identifier and a second universal command identifying a particular play control to be performed with respect to the first content being played in the first session, wherein the second universal command is different than the first universal command;

converting, using the switchboard server system, the second universal command into a corresponding second converted code specific to the specified first media player to perform the particular play control;

receiving, at the display host, the second converted code and the unique identifier from the switchboard server system;

executing, by the display host, the second converted code to perform the particular play control with respect to the first content being played in the first session that is mirrored onto the virtual client residing on the display device.

5. The method of claim 4, wherein the unique identifier comprises a QR code.

6. The method of claim 4, further including:

receiving, at the switchboard server system, a third message originating from the handheld Internet-enabled personal computing device, wherein the third message comprises the unique identifier and the first universal command instructing that second content be played in the first session in the first session using a specified second media player of the media players;

converting, using the switchboard server system, the first universal command into a corresponding third converted code specific to the specified second media player to control playing of the second content on the specified second media player;

receiving, at the display host, the third converted code and the unique identifier from the switchboard server system;

in response to receiving the third converted code and the unique identifier, retrieving and loading, by the display host, the specified second media player using the first instance of the swappable media player;

playing, at the display host, the second content in the first session using the specified second media player by executing the third converted code; and causing, by the display host, a presentation of the second content to be mirrored onto the virtual client residing on the display device.

7. The method of claim 6, further including:

establishing a third communications link between the display host and a second display device;

receiving, at the display host, a fourth message, wherein the fourth message comprises a second unique identifier associated with the second display device and a second session opened using a second instance of the swappable media player, and the first universal command instructing that third content be played in the second session using a specified third media player of the media players;

converting, using the switchboard server system, the first universal command into a corresponding fourth converted code specific to the specified third media player to control playing of the third content on the specified third media player;

receiving, at the display host, the fourth converted code and the second unique identifier from the switchboard server system;

in response to the fourth converted code and the second unique identifier, retrieving and loading, by the display host, the specified third media player using the second instance of the swappable media player;

playing, at the display host, the third content in the second session using the specified second media player by executing the fourth converted code; and causing, by the display host, a presentation of the third content to be mirrored onto a virtual client residing on the second display device.

8. The method of claim 7 wherein the first and second sessions at least partially overlap in time with one another.

9. The method of claim 4 wherein the first content comprises video.

10. The method of claim 4 wherein the first content comprises streaming media.

11. The method of claim 4 wherein the first content comprises visual content.

12. The method of claim 4, further including contacting the switchboard server system using the display host to check whether there is a message for the first session, wherein the first session is identified to the switchboard session using the unique identifier.

13. The method of claim 4, wherein the display host retrieves the specified first media player from a content provider via the Internet.

14. The method of claim 4, wherein converting the first universal command into the corresponding first converted code comprises selecting the corresponding first converted code from among a plurality of specific codes, each of which represents a corresponding playback control command for a respective media player.

15. The method of claim 4, wherein converting the first universal command into the corresponding first converted code comprises:
   determining an identity of the specified first media player;
   loading an appropriate set of protocols or application programming interfaces from a library based on the identity of the specified first media player; and
   converting the first universal command into the corresponding first converted code based on the set of protocols or application programming interfaces.

16. The method of claim 4, wherein the first universal command and the second universal command are not specific to the first media player.

17. A method of presenting content, the method comprising:
   executing, at a display host, a plurality of instances of a browser, wherein each instance of the browser is configured to retrieve and load any of a plurality of different media players to play specified content;
   associating, at a switchboard server system, a first instance of the browser with a first handheld Internet-enabled personal computing device and a first display device;
   receiving, at the switchboard server system from the first personal computing device, a first message comprising a unique identifier associated with the first instance of the browser and the first display device, and a universal command instructing that first content be played in the first instance of the browser using a first media player;
   converting, using the switchboard server system, the universal command to a first portion of code specific to the first media player to control playing of the first content on the first media player;
   transmitting, from the switchboard server system, the first portion of code and the unique identifier to the display host;
   retrieving and loading, by the display host, the first media player using the first instance of the browser;
   executing, at the display host, the first portion of code to play the first content in the first instance of the browser using the first media player; and
   causing, by the display host, a presentation of the first content to be mirrored onto a virtual client residing on the first display device.

18. The method of claim 17, further comprising:
   receiving, at the switchboard server system from the first Internet-enabled personal computing device, a second message comprising the unique identifier and the universal command instructing that second content be played in the first instance of the browser using a second media player;
   converting, using the switchboard server system, the universal command to a second portion of code specific to the second media player to control playing of the second content on the second media player;
   transmitting, from the switchboard server system, the second portion of code and the unique identifier to the display host;
   retrieving and loading, by the display host, the second media player using the first instance of the browser;
   executing, at the display host, the second portion of code to play the second content in the first instance of the browser using the second media player; and
   causing, by the display host, a presentation of the second content to be mirrored onto the virtual client residing on the first display device.

19. The method of claim 18, further comprising:
   associating, at a switchboard server system, a second instance of the browser with a second handheld Internet-enabled personal computing device and a second display device;
   receiving, at the switchboard server system from the second personal computing device, a third message comprising a second unique identifier associated with the second display device and the second instance of the browser, and the universal command instructing that third content be played in the second instance of the browser using a third media player;
   converting, using the switchboard server system, the universal command to a third portion of code specific to the third media player to control playing of the third content on the third media player;
   transmitting, from the switchboard server system, the third portion of code and the second unique identifier to the display host;
   retrieving and loading, by the display host, the third media player using the second instance of the browser;
   executing, at the display host, the third portion of code to play the third content in the second instance of the browser using the third media player;
   causing, by the display host, a presentation of the third content to be mirrored onto a virtual client residing on the second display device.

20. The method of claim 19, wherein the universal command is not specific to the first, second, or third media players.

* * * * *